(12) United States Patent
Yamamoto

(10) Patent No.: US 6,406,159 B1
(45) Date of Patent: Jun. 18, 2002

(54) BACK-LIGHT DEVICE FOR LIQUID CRYSTAL DISPLAY

(75) Inventor: Ryuya Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/477,526

(22) Filed: Jan. 4, 2000

(30) Foreign Application Priority Data

Jan. 8, 1999 (JP) ............................................ 11-002958

(51) Int. Cl.[7] ................................................. F21V 7/04
(52) U.S. Cl. ............................. 362/31; 362/26; 362/293
(58) Field of Search ................................. 362/261, 271, 362/31, 583, 293

(56) References Cited

U.S. PATENT DOCUMENTS 5,618,096 A * 4/1997 Parker et al. .................. 362/31

FOREIGN PATENT DOCUMENTS

| JP | 63-104077 | 5/1988 |
| JP | 2-238439 | 9/1990 |
| JP | 4-361231 | 12/1992 |
| JP | Hei9-244019 | 9/1997 |
| JP | H9-274182 | 10/1997 |

* cited by examiner

*Primary Examiner*—Stephen Husar
(74) *Attorney, Agent, or Firm*—Scully, Scott, Murphy & Presser

(57) ABSTRACT

A back-light device for a liquid crystal display in which chromaticity can be corrected without impairing the brightness of a liquid crystal display panel and in which the occurrence of bright lines can be effectively prevented. In the back-light device for the liquid crystal display provided with a reflection sheet on one side of a light guiding plate and a diffusion sheet on the other side of the same and a light source composed of a cathode tube on the side, a chromaticity correcting film is mounted to the end, positioned nearer to the cathode tube, of the reflection sheet and light partially reflected off the upper surface of the light guiding plate is reflected off the reflection sheet and returns to the light guiding plate. By repeated reflection of light between the light guiding plate and the reflection sheet, the corrected light is spread uniformly over the whole of the light guiding plate, thus promoting the correction of chromaticity.

6 Claims, 6 Drawing Sheets

← - - corrected light
← —— non-corrected light

BACK-LIGHT DEVICE FOR LIQUID CRYSTAL DISPLAY

BACKGROUND OF THE INVENTION

1. Field of the Invention

The present invention relates to a back-light device for a liquid crystal display (LCD) and more particularly to a side-light type back-light device for LCDs provided with a cathode tube on the side of a light guiding plate.

2. Description of the Related Art

In recent years, instead of a cathode-ray tube (CRT) and the like, a liquid crystal display (LCD) is widely employed as a display device because it requires less space.

Configurations and functions of the back-light device for LCDs are hereinafter described by referring to FIGS. 1 and 9. FIG. 1 is an exploded view explaining configurations of a side-light type back-light device for LCDs according to a first embodiment of the present invention. FIG. 9 is a sectional view explaining configurations of a conventional back-light device.

As shown in FIG. 1, the back-light device for LCDs of the present invention is comprised of a cathode tube 5 used as a light source for the back light, a cathode tube reflection plate 4 to reflect light emitted by the cathode tube 5, a reflection sheet 2 to reflect light toward the direction of an LCD panel, a light guiding plate 1 to guide light to a liquid crystal display surface and a diffusion sheet 6 to diffuse light given by the light guiding plate 1. Light from the cathode tube 5 reflected off the cathode tube reflection plate 4 is repeatedly reflected between the light guiding plate 1 and the reflection sheet 2, and then enters, while being scattered, the LCD panel as uniform light.

As a display screen of the LCD of this kind is increasing in size, it becomes necessary to make smaller a region other than a display region, i.e., a rim of the display screen as much as possible. If, however, the rim of the display screen is made smaller, since light reflected off the reflection sheet 2 or the cathode tube reflection plate 4 enters more a region being near to the cathode tube 5 on the LCD screen compared with other regions, a bright line composed of line-like light is produced, causing the impairment of the display quality of the LCD screen.

A method for preventing such bright lines is disclosed in Japanese Laid-open Patent Application No. Hei9-244019 in which a gray or black reflection preventing film is provided in a portion, positioned nearer to the cathode tube, of the reflection sheet. This method is explained below by referring to FIG. 9. Light (shown by dotted lines) being radiated on the end of a portion, which is positioned nearer to the cathode tube 5, of the reflection sheet 2, out of light emitted from the cathode tube 5, enters a region, positioned nearer to the cathode tube 5, of the LCD panel and tends to form bright lines if no reflection preventing film 8 is mounted. However, in the configurations as shown in FIG. 9, since the reflection preventing film 8 is mounted at the end of the reflection sheet 2, light entering this reflection preventing film 8 does not return to the light guiding plate 1, thus eliminating the occurrence of bright lines.

In LCDs, it is important to adjust chromaticity according to various applications. The methods for adjusting chromaticity includes changing a color of the cathode 5 itself, adding new members or parts such as a chromaticity correcting filter or the like to the reflection sheet 2 or to the cathode tube refection plate 4 or additionally performing a coloring process.

However, such conventional technologies present problems. That is, it is required in LCDs that the occurrence of bright lines can be prevented, the chromaticity can be easily adjusted and the moderate brightness can be maintained. Though, in the conventional methods as described above, the occurrence of bright lines can be prevented by providing the reflection preventing film 8 to the portion, positioned nearer to the cathode tube 5, of the reflection sheet 2, there is a problem that the brightness is lowered because light entering the reflection preventing film 8 cannot be effectively used.

Moreover, in the method where the color of the cathode tube 5 is changed to adjust the chromaticity, it is necessary to prepare various kinds of the cathode tubes being different in the chromaticity and, therefore, a great number of man-hours and much time are needed. Also, in the method where the new parts such as the chromaticity correcting filter or the like are added to the whole of the reflection sheet 2 or cathode tube reflection plate 4, or where coloring processes are performed on the whole of the reflection sheet 2 or cathode tube reflection plate 4, a reflection efficiency rate is lowered and, though the chromaticity is adjusted, the brightness is lowered.

SUMMARY OF THE INVENTION

In view of the above, it is an object of the present invention to provide a back-light device for a liquid crystal display (LCD) in which chromaticity can be corrected at low cost and desired back-light color can be obtained without impairing the brightness of an LCD panel and in which the occurrence of bright lines can be effectively prevented.

According to a first aspect of the present invention, there is provided a back-light device for a liquid crystal display comprising:

a light guiding plate;

a diffusion sheet mounted in proximity to a surface on one side of the light guiding plate, which light being transmitted through the surface on one side of the light guiding plate out of light incident on the light guiding plate;

a reflection sheet mounted in proximity to a surface on other side of the light guiding plate, which is used to reflect light reflected off the surface of one side of the light guiding plate;

a chromaticity correcting member for correcting chromaticity provided at a part of a region where light incident on the light guiding plate passes or is reflected; and whereby the light reflected off a reflection sheet is reflected repeatedly between the surface on one side of the light guiding plate and the reflection sheet, causing light incident on the light guiding plate to be uniformly radiated over a liquid crystal display panel.

According to a second aspect of the present invention, there is provided a back-light device for a liquid crystal display comprising:

a light guiding plate;

a cathode tube used to emit light into the light guiding plate;

a diffusion sheet mounted in proximity to a surface on one side of the light guiding plate, which light being transmitted through the surface on one side of the light guiding plate out of light incident on the light guiding plate;

a reflection sheet mounted in proximity to a surface on other side of the light guiding plate, which is used to reflect light reflected off the surface on one side of the light guiding plate;

a chromaticity correcting member for correcting chromaticity mounted at the end, positioned nearer to the cathode tube, of the reflection sheet; and whereby the light reflected off the reflection sheet is reflected repeatedly between the surface on one side of the light guiding plate and the reflection sheet, causing light incident on the light guiding plate to be uniformly radiated over a liquid crystal display panel.

According to a third aspect of the present invention, there is provided a back-light device for a liquid crystal display comprising:

a light guiding plate;

a cathode tube used to emit light into the light guiding plate;

a diffusion sheet mounted in proximity to a surface on one side of the light guiding plate, which light being transmitted through the surface on one side of the light guiding plate out of light incident on the light guiding plate;

a reflection sheet mounted in proximity to a surface on other side of the light guiding plate, which is used to reflect light reflected off the surface on one side of the light guiding plate; and a chromaticity correcting member for correcting chromaticity mounted at the end, positioned nearer to the cathode tube, of a surface on which the diffusion sheet is attached;

whereby the light reflected off the reflection sheet is reflected repeatedly between the surface on one side of the light guiding plate and the reflection sheet, causing light incident on the light guiding plate to be uniformly radiated over a liquid crystal display panel.

In the foregoing, a preferable mode is one wherein the chromaticity correcting member for correcting chromaticity is provided with a reflection film which reflects only light having a predetermined wavelength.

Also, a preferable mode is one wherein the chromaticity correcting member for correcting chromaticity contains a plurality of roughly semi-spherical scattering bodies which scatters and reflects only light having a predetermined wavelength.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 3:
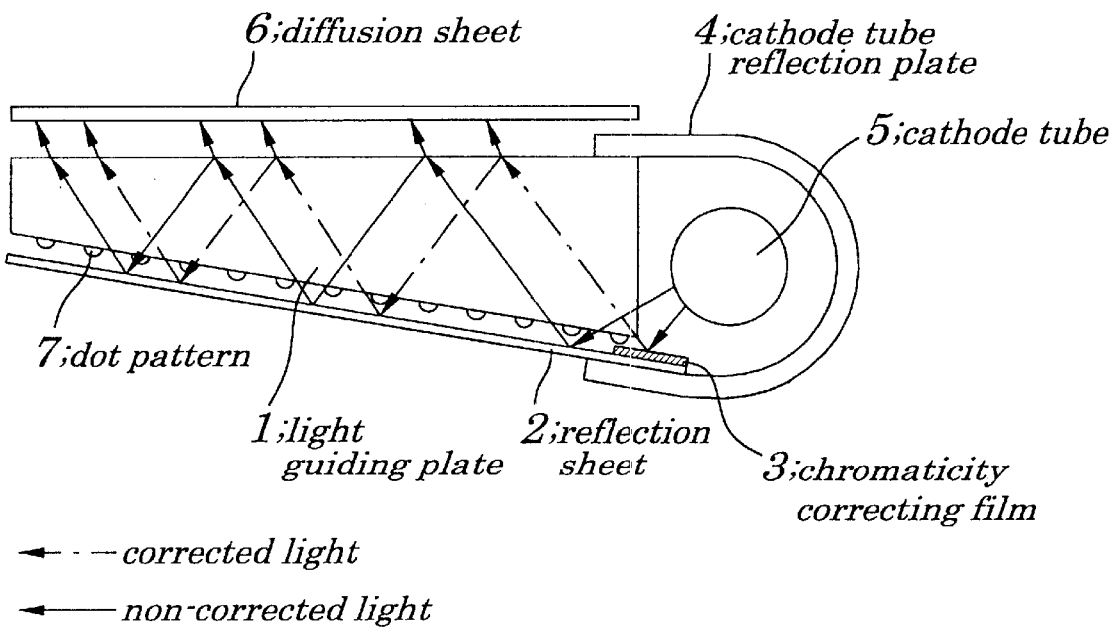
FIG. 3 is a sectional view explaining functions of the back-light device for LCDs of the first embodiment of the present invention.

According to preferred embodiments of the present invention, as shown in FIG. 3, the back-light device for LCDs is provided with a reflection sheet 2 on one side of the light guiding plate 1 and a diffusion sheet 6 on the other side of the same, a light source composed of a cathode tube 5 and a chromaticity correcting film 3 on the end, positioned nearer to the cathode tube, of the reflection sheet, in which light partially reflected on the screen surface of the light guiding plate 1 is reflected by the reflection sheet 2 and returns to the light guiding plate 1 and further reflected repeatedly between the light guiding plate 1 and the reflection sheet 2, causing corrected light to uniformly spread over the whole of the light guiding plate 1 and chromaticity to be adjusted.

First Embodiment

Figure 1:
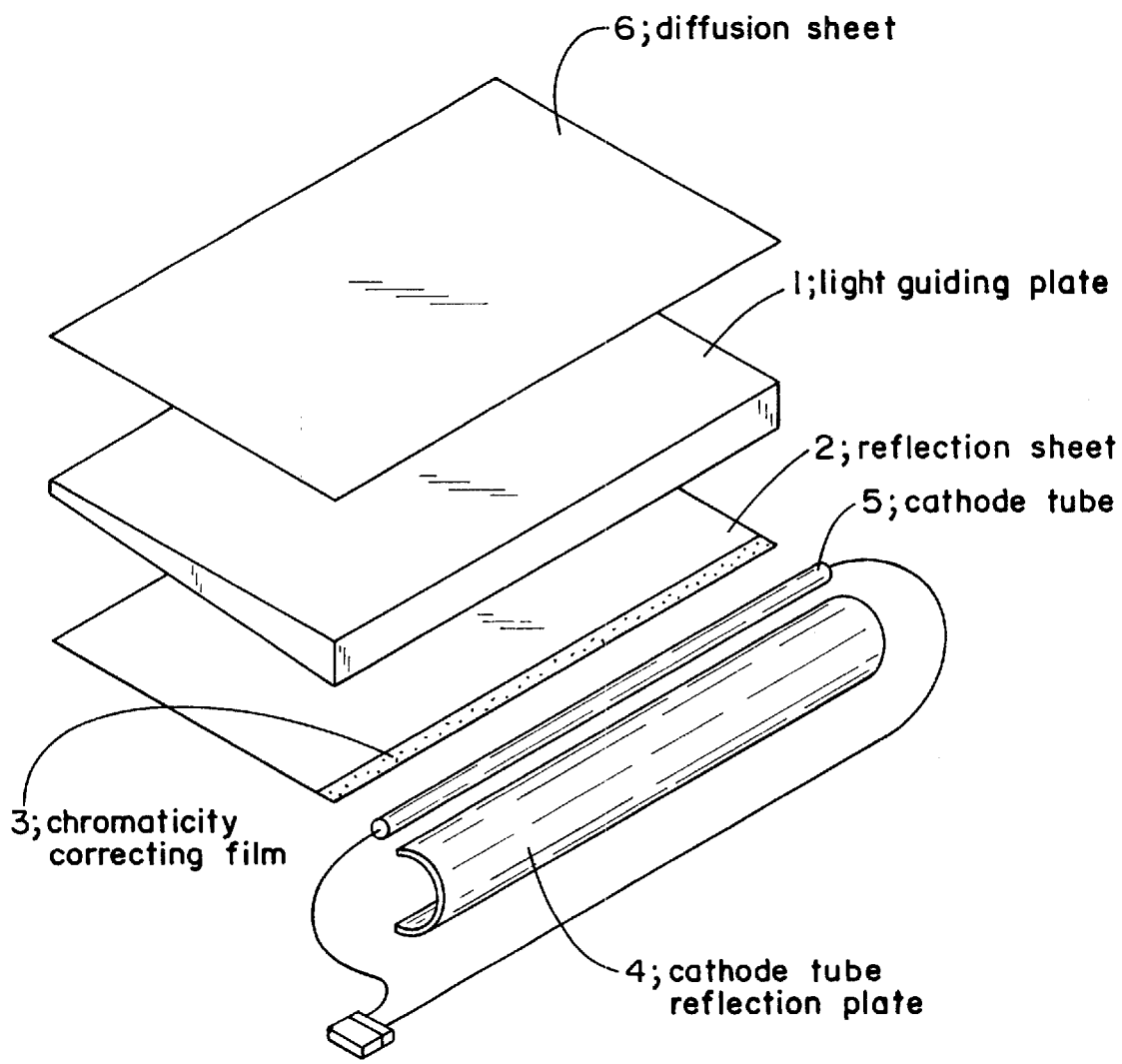
FIG. 1 is an exploded view explaining configurations of a side-light type back-light device for a liquid crystal device (LCD) according to a first embodiment of the present invention.
Figure 2:
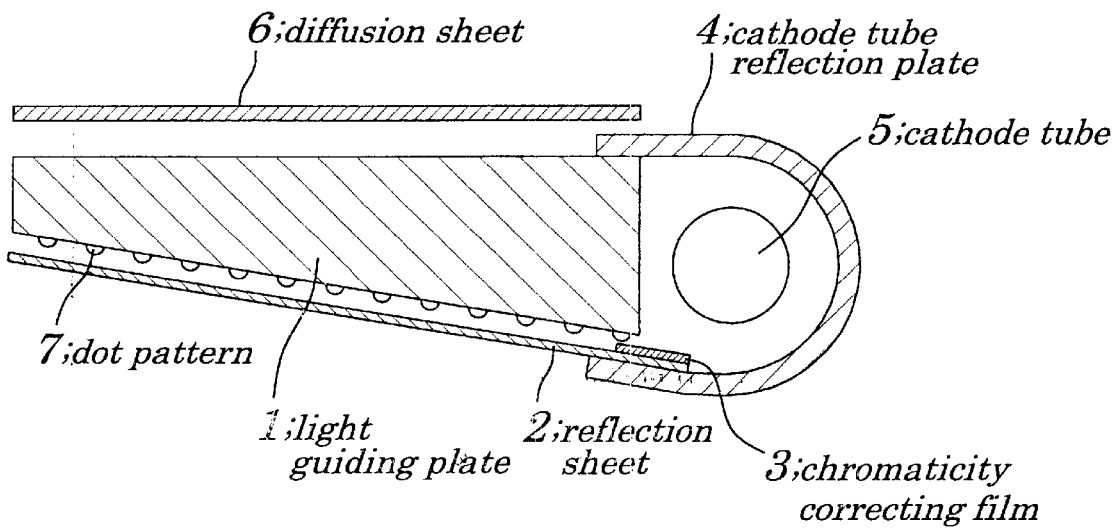
FIG. 2 is a sectional view of the back-light device for LCDs of the first embodiment of the present invention.
Figure 4:
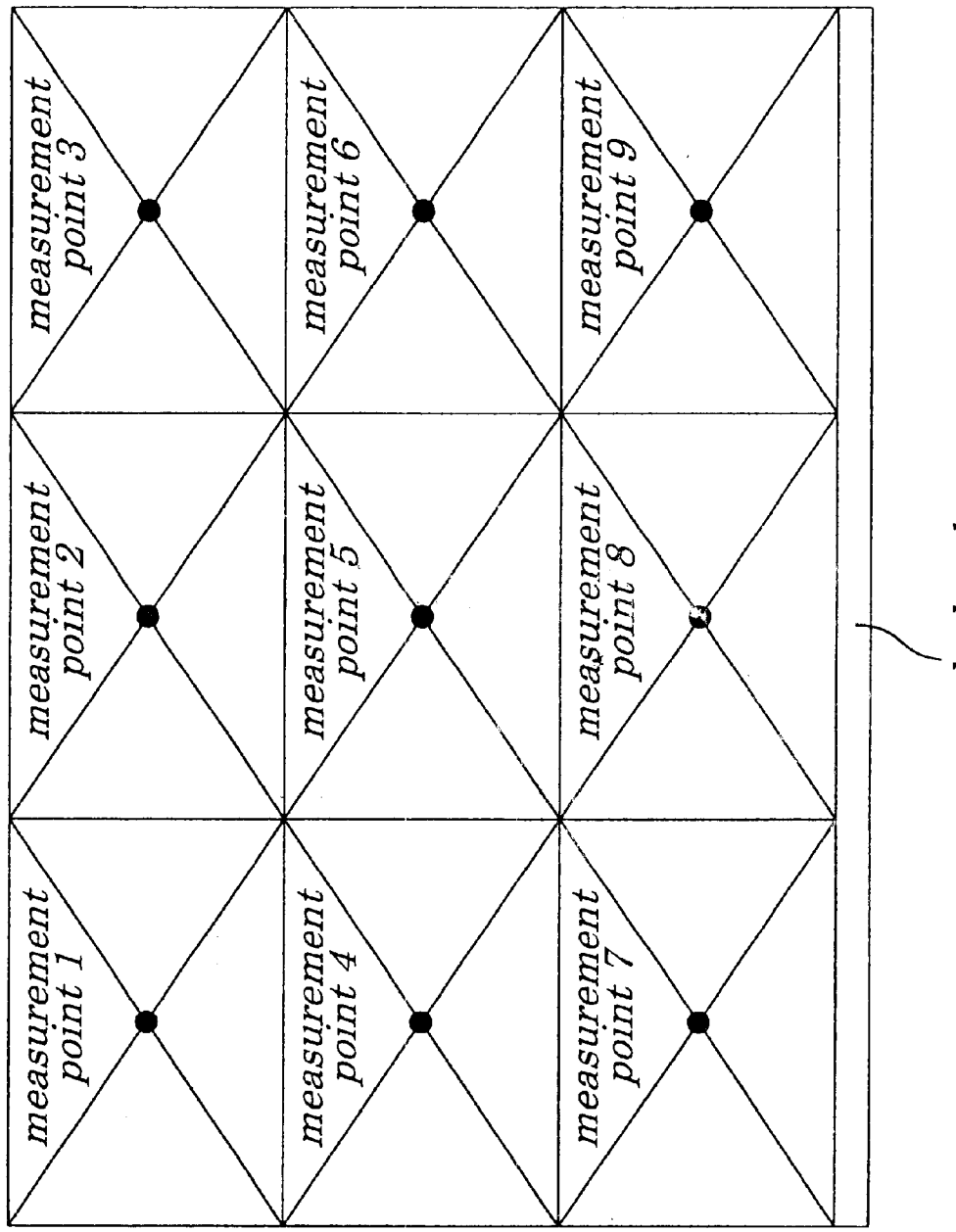
FIG. 4 is a diagram showing measurement points for measuring brightness of the back-light device for LCDs of the first embodiment.
Figure 5:
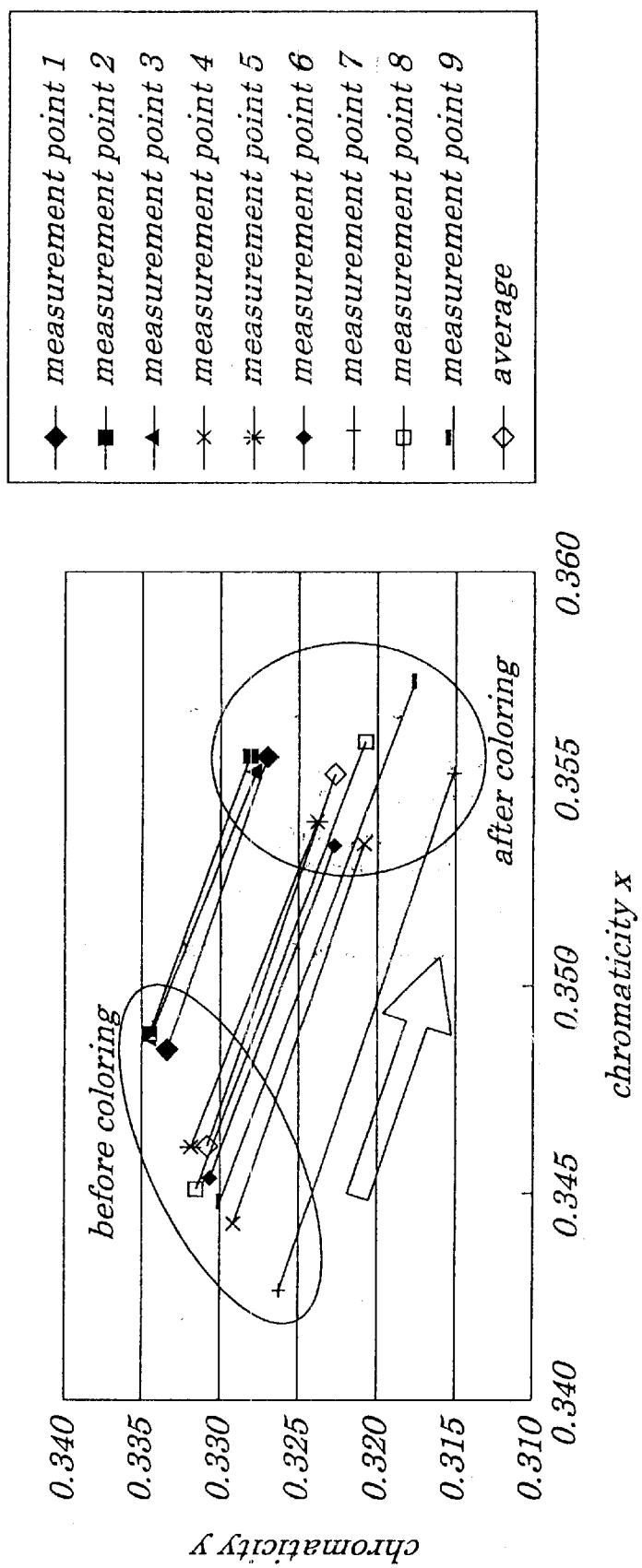
FIG. 5 is a diagram showing results of measurement of the brightness of the back-light device for LCDs of the first embodiment.
Figure 6:
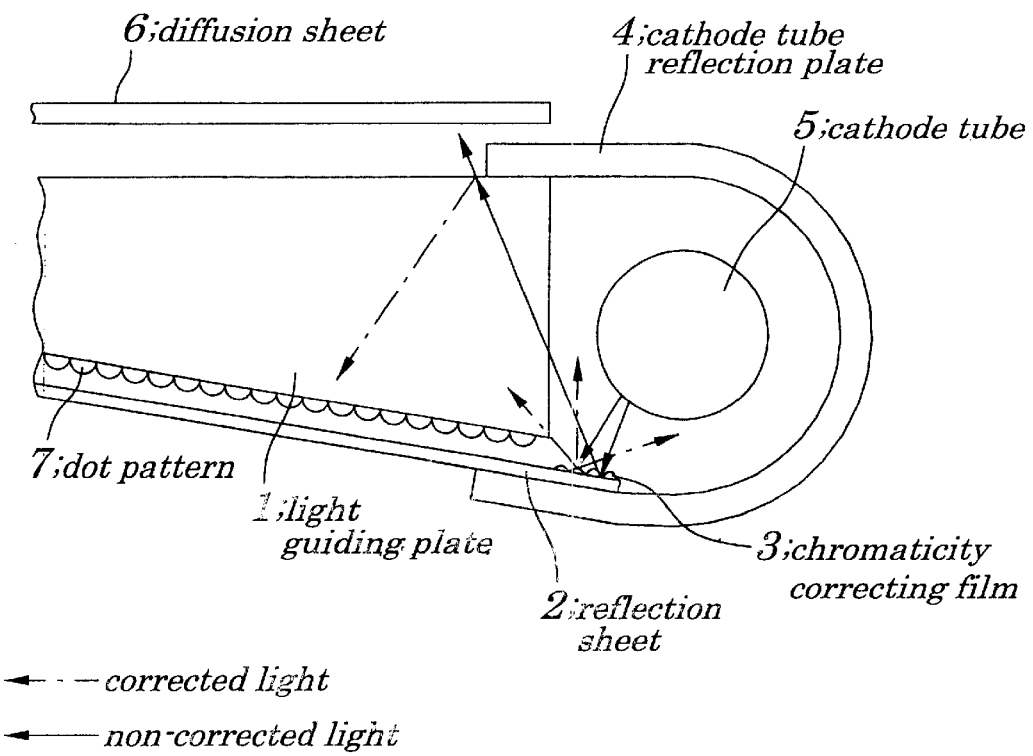
FIG. 6 is a sectional view explaining functions of the back-light device for LCDs of the first embodiment.

Configurations and operations of the back-light device of the first embodiment are described by referring to FIGS. 1 to 6 and Table 1. FIG. 1 is an exploded view explaining configurations of a side-light type back-light device for a liquid crystal device (LCD) according to a first embodiment of the present invention. FIG. 2 is a sectional view of the back-light device of the first embodiment of the present invention. FIG. 3 is a schematic diagram explaining a state where light emitted by a cathode tube 5 uniformly spreads within a light guiding plate 1. FIGS. 4 and 5 are diagrams showing experiment methods to verify the effects of chromaticity correction and experimental results in the back-light device of the first embodiment. In FIGS. 4 and 5, measurement points of chromaticity and changes in the same are shown respectively. FIG. 6 is a sectional view showing the back-light device for LCDs using a correction film containing a roughly semi-spherical scattering body as a chromaticity correcting film 3.

Referring to FIGS. 1 and 2, the back-light device for LCDs of the first embodiment is comprised of a light guiding plate 1 used to guide light to the whole of a screen surface, a reflection sheet 2 used to reflect light emitted in the downward direction from the light guiding plate 1 and to return light back to the light guiding plate 1, a chromaticity correcting film 3 mounted on the end of the reflection sheet having both functions of correcting chromaticity and of preventing the occurrence of bright lines, a cathode tube reflection plate 4 used to reflect light to the direction of the light guiding plate 1, a cathode tube 5 used as a light source, a diffusion sheet 6 to diffuse light radiated on an LCD panel from the light guiding plate 1 and a dot pattern 7 used to diffuse light reflected off the light guiding plate 1 or reflection sheet. As shown in FIG. 1, the chromaticity correcting film 3 is provided in proximity to the light source.

Referring to FIG. 3, light radiated by the cathode tube 5 is reflected off the cathode tube reflection plate 4 or reflection sheet 2 and diffused by the dot pattern 7 or diffusion sheet 6 and finally becomes plane-like light used to radiate the LCD panel. According to this embodiment, the chromaticity of light entering the chromaticity correcting film 3, out of light emitted from the cathode tube 5, is corrected by the chromaticity correcting film 3. The corrected light is then mixed, while being reflected and diffused within the light guiding plate 1, with light not impinging on the chromaticity correcting film 3 and the chromaticity of the whole of the screen surface is corrected.

Experiment procedures and results to verify the effects of the correction of chromaticity are described by referring to FIGS. 4 and 5. The experiment to verify the effects was performed in such a manner that red ink was applied to the chromaticity correcting film 3 positioned in proximity to the light source and the cathode tube 5 was lit using a single back-light device without the LCD panel. The measurement points are 9 points each being positioned at the center of each portion obtained by splitting the screen into nine portions.

Table 1 shows results of the experiments under conditions described above.

TABLE 1

|  | Before coloring | | After coloring | |
| --- | --- | --- | --- | --- |
|  | Chromaticity x | Chromaticity y | Chromaticity x | Chromaticity y |
| Measurement point 1 | 0.3486 | 0.3338 | 0.3557 | 0.3271 |
| Measurement point 2 | 0.3490 | 0.3345 | 0.3556 | 0.3279 |
| Measurement point 3 | 0.3488 | 0.3345 | 0.3552 | 0.3279 |
| Measurement point 4 | 0.3444 | 0.3294 | 0.3534 | 0.3209 |
| Measurement point 5 | 0.3461 | 0.3319 | 0.3542 | 0.3236 |
| Measurement point 6 | 0.3453 | 0.3309 | 0.3534 | 0.3226 |
| Measurement point 7 | 0.3426 | 0.3267 | 0.3552 | 0.3150 |
| Measurement point 8 | 0.3451 | 0.3318 | 0.3559 | 0.3207 |
| Measurement point 9 | 0.3449 | 0.3300 | 0.3574 | 0.3174 |
| Average | 0.3461 | 0.3315 | 0.3551 | 0.3226 |

The results of Table 1 are shown in the form of a drawing in FIG. 5. As is apparent, the chromaticity at all measurement points within the screen is corrected.

Since the chromaticity can be corrected for the whole surface of the screen only by providing the chromaticity correcting film 3 to the end, positioned nearer to the cathode tube 5, of the reflection sheet, new attachment of the chromaticity correcting filter to the whole of the surface of the screen or a new additional coloring process is not required, thus preventing brightness from being lowered, and enabling the easy adjustment of the chromaticity.

The chromaticity correcting film 3 may take the shape of roughly semi-spherical scattering body as shown in FIG. 6. Since the chromaticity correcting film 3 allows light incident on the same to be diffused and to be uniformly spread within the light guiding plate 1, the chromaticity can be corrected more uniformly on the whole of the screen surface. Moreover, because light is scattered by the chromaticity correcting film 3, light can be prevented from being concentrated in the vicinity of the cathode tube 5 of the LCD panel and the occurrence of bright lines can be reduced. Also, the bright lines can be removed effectively by adjusting the thickness of the chromaticity correcting film 3, color, dot size, dot interval or the like.

Second Embodiment

Figure 7:
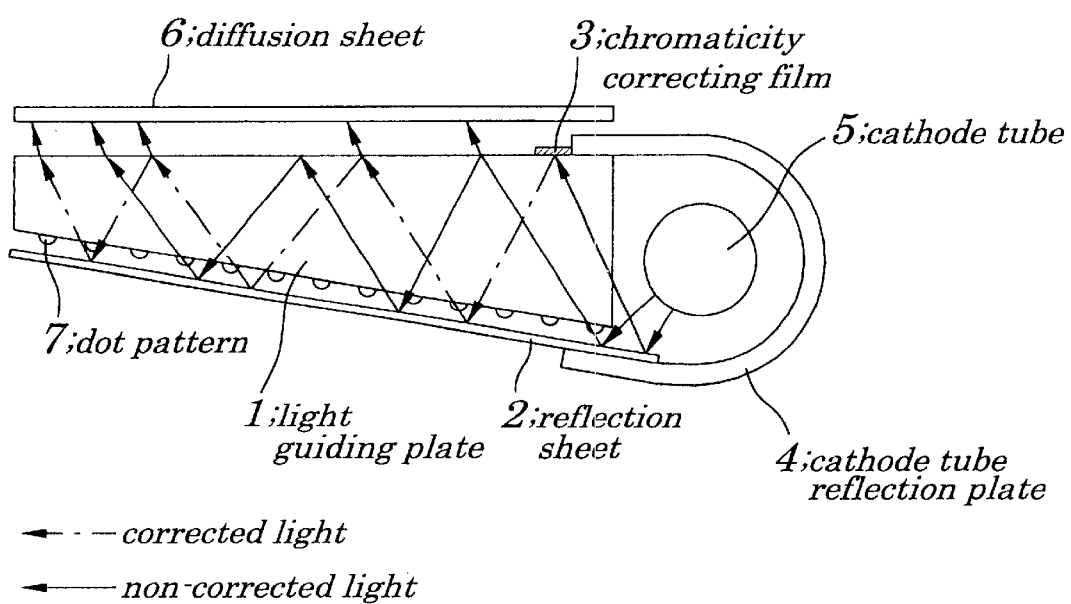
FIG. 7 is a sectional view illustrating configurations of a back-light device for LCDs according to a second embodiment of the present invention.
Figure 8:
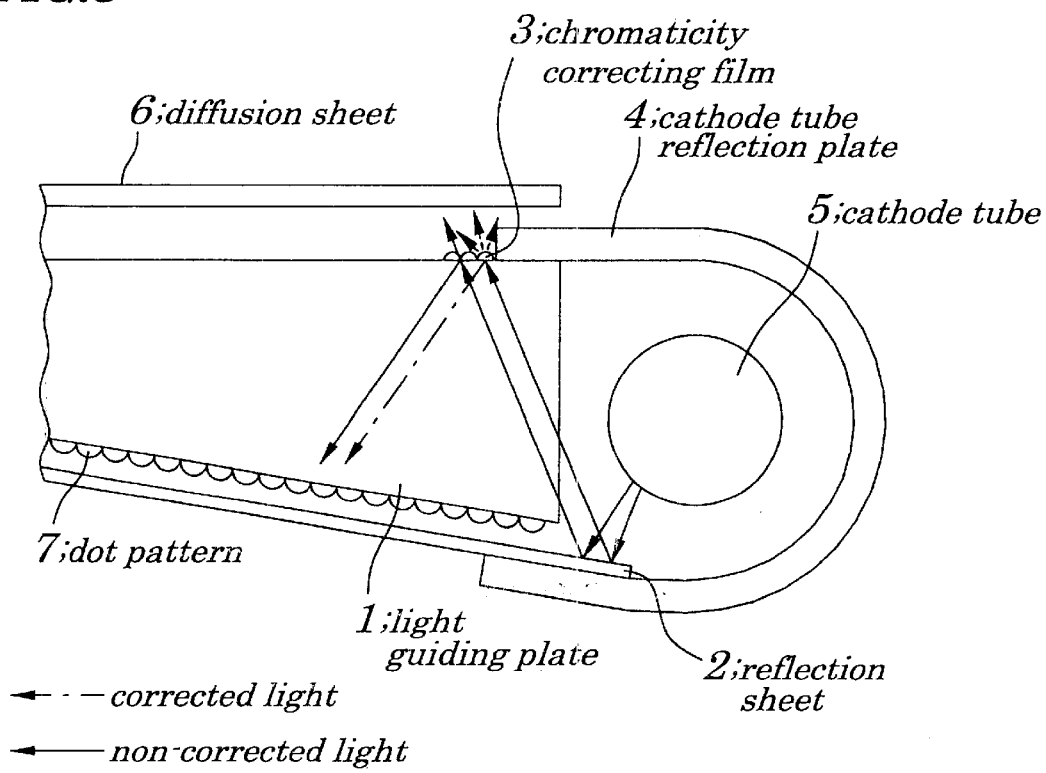
FIG. 8 is a sectional view explaining functions of the back-light device for LCDs of the second embodiment of the present invention.
Figure 9:
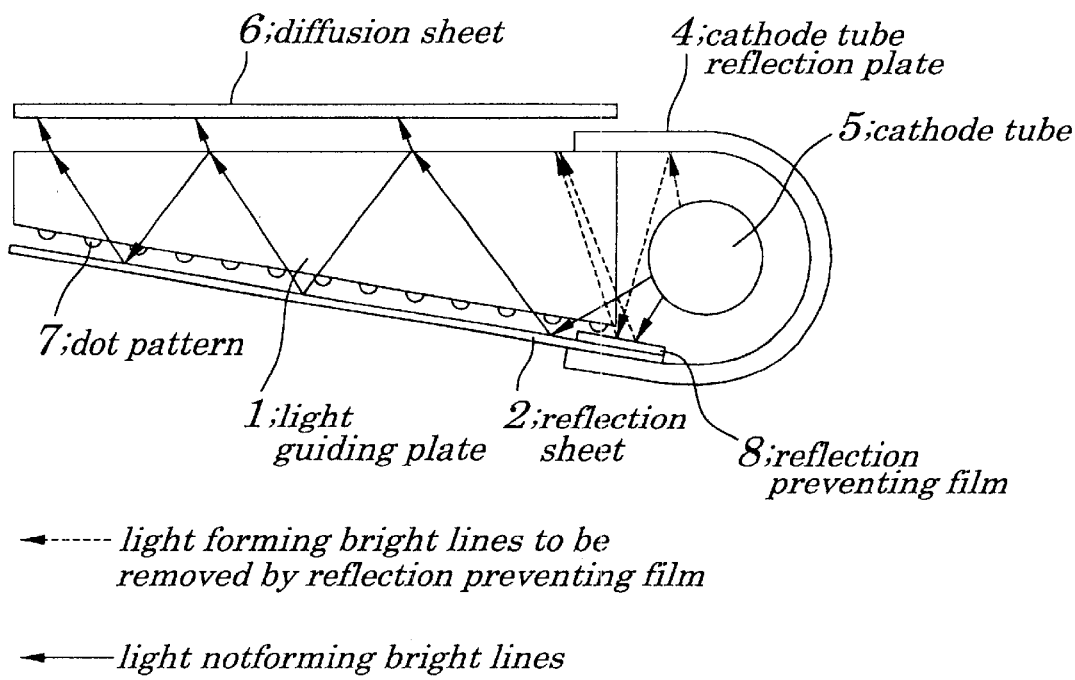
FIG. 9 is a sectional view explaining configurations of a conventional back-light device for LCDs.

Configurations and operations of the back-light device of the second embodiment of the present invention are described by referring to FIGS. 7 and 8. FIG. 7 is a sectional view illustrating configurations of a back-light device for LCDs according to a second embodiment of the present invention.

FIG. 8 is a sectional view explaining functions of the back-light device for LCDs using a correcting film including a roughly semi-spherical scattering body as a chromaticity correcting film 3 of the second embodiment of the present As shown in FIG. 7, the back-light device of the second embodiment is comprised of a light guiding plate 1, a reflection sheet 2, a chromaticity correcting film 3 mounted on the end of the light guiding plate 1 having both functions of correcting chromaticity and of preventing the occurrence of bright lines, a cathode tube reflection plate 4, a cathode tube 5, a diffusion sheet 6 and a dot pattern 7. The configurations of the back-light device of the second embodiment differs greatly from those of the first embodiment in that the chromaticity correcting means is mounted at the end of a light guiding plate 1 on the side of the diffusion sheet 6, not on the side of the reflection sheet 2.

According to the second embodiment, the chromaticity of excessive light forming bright lines in the vicinity of the cathode tube 5, out of light radiated by the cathode tube 5, is corrected by the chromaticity correcting film 3 provided on the upper side of the light guiding plate 1 and the light is repeatedly reflected within the light guiding plate 1, while light not forming bright lines is not corrected by the chromaticity correcting film 3 and the light is reflected repeatedly within the light guiding plate 1, and the corrected light is mixed, while being reflected and scattered within the light guiding plate 1, with light not incident on the chromaticity correcting film 3, thus correcting the chromaticity of the whole of the screen surface in the same manner as in the first embodiment.

Thus, since the chromaticity can be corrected for the hole screen surface only by providing the chromaticity correcting film 3 to the end, positioned nearer to the cathode tube 5, of the light guiding plate 1, without a new attachment of the chromaticity correcting filter to the whole of the reflection sheet 2 or cathode tube reflection plate 4, or a new addition of a coloring process, the brightness can be prevented from being lowered and the chromaticity can be easily adjusted. Moreover, by mounting the chromaticity correcting film 3 on the light guiding plate 1, the occurrence of bright lines can be effectively prevented and a rise in the manufacturing cost can be reduced more compared with when mounting the chromaticity correcting filter or the like on the whole of the reflection sheet 2 or cathode tube reflection plate 4.

The chromaticity correcting film 3 may take the shape of roughly semi-spherical scattering body as shown in FIG. 8 and, since the chromaticity correcting film 3 allows light incident on the same to be diffused and to be uniformly spread within the light guiding plate 1, the chromaticity can be corrected more uniformly on the whole of the screen surface.

The prevention of bright lines and correction of the chromaticity can be effectively achieved by adjusting transmittance and reflectance of the chromaticity correcting film 3, dot size, dot interval or the like.

As described above, according to the prevent invention, the chromaticity can be corrected with almost no lowering of brightness on the grounds that, by mounting the chromaticity correcting film 3 instead of a reflection preventing film 8 to avoid the occurrence of bright lines, light absorbed by the reflection preventing film 8 can be utilized for correcting the chromaticity and that, by causing light corrected by the chromaticity correcting film 3 to be reflected repeatedly within the light guiding plate 1, the light can be scattered uniformly over the whole of the LCD panel, thus allowing the area of the chromaticity correcting film 3 to be reduced and reducing the absorption of light by the chromaticity correcting film 3.

Furthermore, according to the present invention, the correction of the chromaticity can be achieved at lower cost when compared to conventional method on the grounds that, by mounting the chromaticity correcting film 3 having both functions of correcting chromaticity and of preventing the occurrence of bright lines in the vicinity of the reflection sheet 2, instead of the reflection preventing film 8 intended to prevent the occurrence of bright lines, there is no need for additional attachment of members or parts such as the chromaticity correcting filter or the like, or for addition of coloring processes, thus reducing a new cost required for chromaticity correcting members.

It is apparent that the present invention is not limited to the above embodiments but may be changed and modified without departing from the scope and spirit of the invention. For example, the chromaticity correcting film 3 may be mounted to the end of the diffusion sheet 6 at the upper side of the light guiding plate 1 in which case the occurrence of bright lines can be prevented and the chromaticity can be corrected without lowering of the brightness as well.

Finally, the present application claims the priority based on Japanese Patent Application No. Hei11-002958 filed on Jan. 8, 1999, which is herein incorporation by reference.

What is claimed is:

1. A back-light device for a liquid crystal display comprising:

a light guiding plate;

a cathode tube used to emit light into said light guiding plate;

a diffusion sheet mounted in proximity to a surface on one side of said light guiding plate, which light being transmitted through the surface on one side of said light guiding plate out of light incident on said light guiding plate;

a reflection sheet mounted in proximity to a surface on other side of said light guiding plate, which is used to reflect light reflected off the surface on one side of said light guiding plate;

a chromaticity correcting member for correcting chromaticity mounted at the end, positioned nearer to said cathode tube, of said reflection sheet; and whereby the light reflected off said reflection sheet is reflected repeatedly between the surface on one side of said light guiding plate and said reflection sheet, causing light incident on said light guiding plate to be uniformly radiated over a liquid crystal display panel.

2. The back-light device for a liquid crystal display according to claim 1, wherein said chromaticity correcting member for correcting chromaticity is provided with a reflection film which reflects only light having a predetermined wavelength.

3. The back-light device for a liquid crystal display according to claim 1, wherein said chromaticity correcting member for correcting chromaticity contains a plurality of roughly semi-spherical scattering bodies which scatters and reflects only light having a predetermined wavelength.

4. A back-light device for a liquid crystal display comprising:

a light guiding plate;

a cathode tube used to emit light into said light guiding plate;

a diffusion sheet mounted in proximity to a surface on one side of said light guiding plate, which light being transmitted through the surface on one side of said light guiding plate out of light incident on said light guiding plate;

a reflection sheet mounted in proximity to a surface on other side of said light guiding plate, which is used to reflect light reflected off the surface of one side of said light guiding plate;

a chromaticity correcting member for correcting chromaticity mounted on the surface of said light guiding plate, facing the diffusion sheet, and at the end of said light guiding plate nearer to said cathode tube; and whereby the light reflected off said reflection sheet is reflected repeatedly between the surface on one side of said light guiding plate and said reflection sheet, causing light incident on said light guiding plate to be uniformly radiated over a liquid crystal display panel.

5. The back-light device for a liquid crystal display according to claim 4, wherein said chromaticity correcting member for correcting chromaticity is provided with a reflection film which reflects only light having a predetermined wavelength.

6. The back-light device for a liquid crystal display according to claim 4, wherein said chromaticity correcting member for correcting chromaticity contains a plurality of roughly semi-spherical scattering bodies which scatter and reflect only light having a predetermined wavelength.

* * * * *